United States Patent
Mastromatteo et al.

[15] 3,678,135
[45] July 18, 1972

[54] CO-CURE OF BLEND OF RUBBER OF LOW UNSATURATION AND HIGHLY UNSATURATED RUBBER USING LONG CHAIN HYDROCARBON DITHIOCARBAMATE ACCELERATORS

[72] Inventors: Richard Mastromatteo, Woodbury; Thomas J. Brett, Jr., Cheshire, both of Conn.

[73] Assignee: Uniroyal, Inc., New York, N.Y.

[22] Filed: Sept. 9, 1970

[21] Appl. No.: 70,936

[52] U.S. Cl. .............................. 260/889, 152/330, 161/253, 260/23 H, 260/23.7 M, 260/23.7 N, 260/23.7 R, 260/28.5 B, 260/33.6 AQ, 260/41 R, 260/41 A, 260/41 B, 260/41.5 R, 260/91.5 A, 260/79.5 P, 260/79.5 B, 260/429 K, 260/429.9
[51] Int. Cl. .......................................................... C08f 29/12
[58] Field of Search .............. 260/889, 79.5 P, 79.5 B, 429.9, 260/429 K

[56] References Cited

UNITED STATES PATENTS 3,331,793  7/1967  Souffle.........................................260/4

OTHER PUBLICATIONS

Hofmann, Vulcanization and Vul. Agents, pp. 106–111 July 68

*Primary Examiner*—Samuel H. Blech
*Assistant Examiner*—C. J. Seccuro
*Attorney*—James J. Long

[57] ABSTRACT

Use of such long chain hydrocarbon dithiocarbamate accelerators as zinc N-dodecyl, N-isopropyl dithiocarbamate in the sulfur cure of blends of rubber of low unsaturation, particularly EPDM, with highly unsaturated rubbers such as SBR, NBR, etc., produces vulcanizates having high tensile strength.

23 Claims, No Drawings

CO-CURE OF BLEND OF RUBBER OF LOW UNSATURATION AND HIGHLY UNSATURATED RUBBER USING LONG CHAIN HYDROCARBON DITHIOCARBAMATE ACCELERATORS

CROSS-REFERENCE TO RELATED APPLICATION

Copending application Ser. No. 70,935 of R. Amidon and R. Gencarelli, filed of even date herewith, discloses and claims long chain hydrocarbon dithiocarbamates used as accelerators in the present invention.

BACKGROUND OF THE INVENTION

1. Field of the Invention

This invention relates to a vulcanizable rubber composition, a method of vulcanizing, and a vulcanizate so obtained.

2. Prior Art

Blends of EPDM with highly unsaturated rubbers are known to have desirable properties (e.g., U.S. Pat. Nos. 3,356,764, Dec. 5, 1967 and 3,419,639, Dec. 31, 1968 of Gentile; also 3,443,619, May 13, 1969, Kindle), particularly from the standpoint of ozone resistance. However, because of the disparity of curing characteristics between the two kinds of rubber it has been difficult to obtain a good co-cure in the blend. Various special accelerating systems have been suggested (e.g., U.S. Pat. Nos. 3,343,582, Sept. 26, 1967, Himes et al. and 3,451,962, June 24, 1968, Auler et al.). The present invention employs accelerators which result in high tensile strength in the blends.

SUMMARY OF THE INVENTION

In accordance with the invention, the sulfur cure of a blend of a rubber of low unsaturation with a highly unsaturated rubber is accelerated by using a long chain hydrocarbon dithiocarbamate accelerator.

DETAILED DISCLOSURE

The blend with which the invention is concerned comprises a rubber of relatively low unsaturation, blended with a rubber of relatively high unsaturation.

Low unsaturation rubbers include butyl rubber and EPDM. EPDM may be defined as a rubbery copolymer of two or more different alphamonoolefins with at least one copolymerizable polyene. Usually two monoolefins are used, one of which is ordinarily ethylene and the other of which is typically propylene, but other pairs may be used, such as ethylenebutene, propylene-pentene, etc., or more than two olefins may be used, as in ethylene-propylene-butene. The copolymerizable polyene, which confers unsaturation and sulfurvulcanizability on the copolymer, is ordinarily a diene, particularly a non-conjugated diene, whether open chain as in such straight or branched chain diolefins as 1,4-hexadiene, 1,5-hexadiene, 1,9-octadecadiene, 2-methyl-1,5-hexadiene, 6-methyl-1,5-heptadiene, etc; or cyclic (particularly bridged ring) as in dicyclopentadiene, methylene norbornene, ethylidene norbornene, propenyl norbornene, isopropylidene norbornene, butenyl norbornene, methyl tetrahydroindene, etc. 5-Alkylidene-2-norbornenes constitute an important class. More than one diene may be employed. In typical conventional EPDM's, the weight ratio of ethylene to propylene is frequently within the range of from 20/80 to 80/20, preferably between 30/70 and 70/30 by weight. The diene content is relatively low, usually from about 2 to 20 percent, preferably 4 to 12 percent, by weight of the terpolymer. Such amorphous, elastomeric copolymers are further described in the patents referred to above, as well as U.S. Pat. Nos. 3,000,866; 3,000,867; 2,933,480; 3,480,066 and 3,492,370. Preferred dienes are dicyclopentadiene, and 5-ethylidene-2-norbornene.

The rubber of relatively high unsaturation may be defined as a conjugated diene elastomer, whether a homopolymer as in such diolefin homopolymers as polybutadiene (emulsion-prepared or solution-prepared, whether of high cis content or otherwise), polyisoprene (natural or synthetic, emulsion-prepared, or solution-prepared, of high or low cis content), polychloroprene, etc., or copolymers of such diolefins as butadiene or isoprene with copolymerizable monoethylenically unsaturated monomers such as styrene, acrylonitrile, vinyl pyridine, ethyl acrylate, methyl methacrylate or a mixture of such monomers. Usually the copolymer contains at least 50 percent by weight of the diolefin. More than one such highly unsaturated rubber may be used in the blend (e.g., NR and SBR, NR and polyisoprene).

The ratio of rubber of low unsaturation to rubber of high unsaturation in the blend of the invention is usually in the range from 5:95 to 95:5, preferably 20:80 to 80:20, more preferably 30:70 to 70:30.

The composition of the invention is compounded for sulfur-vulcanization, using as the accelerator a long chain hydrocarbon dithiocarbamate of the formula

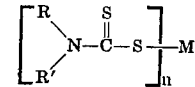

where M is a metal (e.g., zinc, tellurium, nickel, iron, sodium, selenium, bismuth, copper, mercury, magnesium, lead, tin, cadmium, arsenic, antimony, etc., or, equivalently, ammonium), $n$ is a number equal to the valence of the metal and R and R' are the hydrocarbon moities. The hydrocarbon moieties R and R' are non-aromatic and taken together have a total number of at least 10 carbon atoms, preferably at least 14 carbon atoms, and more preferably at least 18 carbon atoms. At least one of the hydrocarbons R, R' has at least eight carbon atoms, preferably at least 12 carbon atoms. A preferred hydrocarbon group is alkyl, having for example up to 30 carbon atoms. One of the alkyls, R,R' may be a cycloalkyl (e.g., cyclopentyl, cyclohexyl) provided the other has at least eight carbon atoms. Of particular interest are the metal dialkyl dithiocarbamates of the foregoing kind which are unsymmetrical, that is, those having one relatively long chain alkyl (e.g., eight, preferably 12, to 20 or more carbon atoms) and one relatively shorter chain (e.g., three to six carbon atoms). Examples include zinc N-dodecyl, N-isopropyl dithiocarbamate, ferric N-octyl, N-propyl dithiocarbamate, selenium N-dodecyl, N-propyl dithiocarbamate, sodium N-octadecyl, N-propyl dithiocarboamate, tellurium N-octyl, N-hexyl (or cyclohexyl) dithiocarbamate, nickel N-dodecyl, N-hexyl dithiocarbamate, copper N-octadecyl, N-hexyl dithiocarbamate, bismuth di(doceyl) dithiocarbamate, lead di(octadecyl) dithiocarbamate, magnesium N-n(mixed $C_{16}$-$C_{18}$ alkyl)-N-isopropyl dithiocarbamate, tin N-n-octadecyl-N-(1,3-dimethyl butyl) dithiocarbamate, cadmium N-n-octadecyl-N-isopropyl dithiocarbamate, zinc N-n-octyl-N-isobutyl dithiocarbamate, etc.

These accelerators may be prepared in known manner by reaction of the appropriate amine with carbon disulfide. The amine used in making N-dodecyl, N-isopropyl dithiocarbamate may be made by alkylation of dodecylamine with acetone.

The accelerator is employed in conventional amounts and the composition may otherwise be compounded in accordance with conventional practice for sulfur vulcanization using sulfur itself or a conventional sulfur-yielding curative, in conventional amounts.

Other conventional compounding ingredients may be present including such activators as metal oxides or salts, fillers or pigments such as carbon black, silica, zinc oxide, extender oils, plasticizers, processing aids, lubricants, stabilizers, antioxidants, antiozonants, blowing agents, etc. The accelerators of the invention may also be used in combination with other conventionally known accelerators if so desired.

The mixture may be prepared in conventional mixing equipment such as a Banbury mixer or a roll mill according to standard practice, and vulcanized in a desired shape at elevated temperature under conventional vulcanizing conditions appropriate to the particular article being fabricated.

The vulcanizate prepared in accordance with the invention is characterized by improved physical properties, especially higher tensile strength than is obtained when the same blend of rubbers in sulfur cured with conventionally used accelerators, as distinguished from the long chain hydrocarbon accelerators described above. Such improved tensile properties are belived to be evidence of co-cure of the rubbers of two different degrees of unsaturation, or attainment of more or less equivalent states of cure in the different rubbers.

A particularly useful embodiment of the invention relates to a sidewall for a pneumatic tire, or a part of a sidewall such as a cover strip or white sidewall, formulated for sulfur curing using the accelerator of the invention. Remarkable resistance to ozone and to cracking is an outstanding characteristic of the present vulcanizates, which renders them particularly valuable for this purpose. The sidewalls or parts thereof display improved adhesion to parts of the tire to which they are vulcanized made of the usual highly unsaturated rubber compositions (e.g., NR, SBR, cis-polybutadiene, polyisoprene, or blends thereof).

The blends may be used in other applications; for example tire tread and carcass compositions as well as compositions for hose, weather stripping, sponge, wire and cable jacketing or insulation, belting, and the like.

An important aspect of the invention resides in a laminate, in which a layer of the composition of the invention is disposed in face-to-face contact with a layer of conventional rubber stock, the two layers being vulcanized together with resulting good adhesion of the layers to each other. The layer to which the composition of the invention is thus adhered is typically a highly unsaturated rubber stock as above defined and it may be compounded for sulfur vulcanization in the conventional manner, using a conventional accelerator, or, optionally, it may if desired employ the special long chain hydrocarbon dithiocaramate accelerator of the same character as employed in the EPDM-highly unsaturated blend of the invention.

The stock of the invention may be used as a "tie gum," or may be applied as a cement, to adhere two other vulcanizable layers together.

A preferred specific embodiment of the invention is a pneumatic tire constructed in the usual manner with a filament-reinforced carcass (reinforced with strands of organic textile, glass, or steel) on which is superimposed the usual tread as the road-contacting member, and which has applied to its sides sidewall members. In accordance with the invention at least a portion of the tire, particularly the sidewall or a portion thereof, especially a white sidewall and if desired a black coverstrip, is made of the EPDM — highly unsaturated rubber blend of the invention containing the described special accelerator. Examples of suitable white sidewall and coverstrip stock formulations are set forth in the working examples below. The carcass and tread may be compounded conventionally of the usual vulcanizable highly unsaturated rubber or rubbers as ordinarily used in carcass and tread stocks. The parts may be fabricated by calendering or extrusion in the usual manner. Assembly of the parts in the usual manner, for example with the aid of a tire building drum, followed by shaping and vulcanization in a tire curing mold, results in a finished pneumatic tire in which the sidewall composition of the invention has good physical properties, is ozone-resistant, and adheres firmly to the carcass, even when the tire develops elevated internal temperatures under conditions of severe or high speed usage. If desired, the specially accelerated blend of the invention may also be used for other parts of the tire as well, particularly the tread or carcass.

The following examples will serve to illustrate the practice of the invention in more detail.

EXAMPLE I

The materials shown in Table I are blended together, in the amounts shown in the table, to make nine different stocks having various compositions. The stocks identified as I—I represents the invention; stocks I-A to I-H are included for comparison. The EPDM employed is an ethylene-propylene-5-ethylidene-2-norbornene terpolymer containing 43 percent propylene by weight, iodine number 20, Mooney viscosity 75 (ML-4 at 212°F). The highly unsaturated rubber employed is a styrenebutadiene copolymer rubber, SBR 1502, containing about 23 percent styrene. The extender oil is Circosol 4240. The accelerators are employed at equivalent molecular quantities (i.e., 0.00164 moles / 100 g of blend). The stocks are cured in a mold at 320°F for 20 minutes and 30 minutes, and the physical properties are determined, with the results shown in the table. The tensile properties of the blended rubbers cured using the accelerator of the invention, namely zinc dodecylisopropyl-dithiocarbamate, stock I—I, are far superior to the tensile properties of blends made with conventional accelerators, stocks I– C and I-F.

[Comparison of long chain hydrocarbon dithiocarbamate accelerators to short chain dithiocarbamate accelerators in blends of SBR and EPDM]

| | Cure time | I-A | I-B | I-C | I-D | I-E | I-F | I-G | I-H | I-I |
|---|---|---|---|---|---|---|---|---|---|---|
| EPDM | | 100.0 | | 50.0 | 100.0 | | 50.0 | 100.0 | | 50.0 |
| SBR | | | 100.0 | 50.0 | | 100.0 | 50.0 | | 100.0 | 50.0 |
| Carbon Black | | 80.0 | 80.0 | 80.0 | 80.0 | 80.0 | 80.0 | 80.0 | 80.0 | 80.0 |
| Extender Oil | | 50.0 | 50.0 | 50.0 | 50.0 | 50.0 | 50.0 | 50.0 | 50.0 | 50.0 |
| Zinc Oxide | | 5.0 | 5.0 | 5.0 | 5.0 | 5.0 | 5.0 | 5.0 | 5.0 | 5.0 |
| Stearic Acid | | 0.75 | 0.75 | 0.75 | 0.75 | 0.75 | 0.75 | 0.75 | 0.75 | 0.75 |
| Zinc dimethyldithiocarbamate | | 0.5 | 0.5 | 0.5 | | | | | | |
| Zinc dibutyldithiocarbamate | | | | | 0.63 | 0.63 | 0.63 | | | |
| Zinc dodecylisopropyldithiocarbamate | | | | | | | | 1.10 | 1.10 | 1.10 |
| Sulfur | | 2.5 | 2.5 | 2.5 | 2.5 | 2.5 | 2.5 | 2.5 | 2.5 | 2.5 |
| Physical properties after cure at 320° F.: | | | | | | | | | | |
| 300% modulus, p.s.i | 20' | 1,020 | 1,400 | | 790 | 1,000 | | 700 | 990 | 1,410 |
| | 30' | 1,220 | 1,580 | | 990 | 1,190 | | 980 | 1,190 | 1,600 |
| Tensile strength, p.s.i | 20' | 2,200 | 2,050 | 1,250 | 1,800 | 1,900 | 1,100 | 1,750 | 1,990 | 1,610 |
| | 30' | 2,300 | 2,050 | 1,280 | 2,190 | 1,990 | 1,400 | 2,180 | 2,150 | 1,680 |
| Elongation, percent | 20' | 650 | 460 | 250 | 800 | 640 | 250 | 780 | 640 | 390 |
| | 30' | 590 | 430 | 230 | 680 | 540 | 290 | 690 | 580 | 340 |

EXAMPLE II

The stocks shown in Table II are prepared using the same EPDM as in Example I, but using a butadiene-acrylonitrile copolymer rubber ("Paracil" BLT, containing 32 percent acrylonitrile) as the highly unsaturated rubber. Stock II-F represents the invention; stocks II-A to II-E are included for comparison. "MBTS" (2,2'-benzothiazyl disulfide) is used in controls II-A to II-C because a zinc dimethyldithiocarbamate cure alone is much too scorchy to handle in NBR. The dithiocarbamate accelerator concentration is 0.00328 moles/100 g of the blend in all cases. After curing at 320°F for the times shown in Table II, the properties are determined, with the results shown. The superiority of stock II-F of the invention over the control blend II-C is manifest. The example may be repeated, using as the EPDM an ethylene-propylene-dicyclopentadiene terpolymer containing 35 percent propylene by weight, iodine number 13, Mooney viscosity 90

ML-4 at 212°F. The example may be repeated, using the various accelerators of the invention named previously.

Stocks IV-D, IV-E, and IV-F the concentration is 0.00164. The EPDM is the same as in Example I.

TABLE II

[Comparison of long chain hydrocarbon dithiocarbamate accelerators to short chain dithiocarbamate accelerators in NBR/EPDM blends]

|  | Cure | II-A | II-B | II-C | II-D | II-E | II-F |
|---|---|---|---|---|---|---|---|
| NBR |  |  | 100.0 | 50.0 |  | 100.0 | 50.0 |
| EPDM |  | 100.0 |  | 50.0 | 100.0 |  | 50.0 |
| Zinc oxide |  | 5.0 | 5.0 | 5.0 | 5.0 | 5.0 | 5.0 |
| Carbon black |  | 50.0 | 50.0 | 50.0 | 50.0 | 50.0 | 50.0 |
| Stearic acid |  | 0.75 | 0.75 | 0.75 | 0.75 | 0.75 | 0.75 |
| MBTS |  | 3.0 | 3.0 | 3.0 |  |  |  |
| Zinc dimethyldithiocarbamate |  | 1.0 | 1.0 | 1.0 |  |  |  |
| Zinc dodecylisopropyldithiocarbamate |  |  |  |  | 2.2 | 2.2 | 2.2 |
| Sulfur |  | 1.0 | 1.0 | 1.0 | 2.5 | 2.5 | 2.5 |
| Physical properties: |  |  |  |  |  |  |  |
| Cure 1, minutes at 320° F |  | 15 | 10 | 10 | 30 | 15 | 15 |
| Cure 2, minutes at 320° F |  | 20 | 15 | 15 | 45 | 30 | 20 |
| 300% modulus, p.s.i | 1 | 1,390 | 2,450 |  |  | 2,620 | 2,190 |
|  | 2 | 1,390 | 2,430 |  |  | 2,630 |  |
| Tensile strength, p.s.i | 1 | 1,790 | 2,890 | 1,000 | 1,810 | 3,000 | 2,200 |
|  | 2 | 1,700 | 2,900 | 1,020 | 2,040 | 3,000 | 2,050 |
| Elongation, percent | 1 | 370 | 360 | 190 | 280 | 350 | 380 |
|  | 2 | 360 | 360 | 210 | 260 | 350 | 350 |
| Hardness, A | 1 | 67 | 62 | 62 | 65 | 69 | 65 |
|  | 2 | 67 | 62 | 63 | 67 | 69 | 65 |

[Comparison of long chain hydrocarbon dithiocarbamate accelerators to short chain dithiocarbamate accelerators in NBR/EPDM blends]

EXAMPLE III

In Table III, a white sidewall composition of the invention containing zinc dodecylisopropyl dithiocarbamate (Stock III-B) is compared to one containing the conventional zinc dimethyl-dithiocarbamate accelerator. The EPDM contains ethylene and propylene in 65/35 weight ratio, and 5 percent by weight of dicyclopentadiene. The zinc oxide is XX203. The silica filler is Hi Sil 215. The titanium dioxide is Titanox RA. The oil is naphthenic Circo light oil. The wax is a microcrystalline paraffin wax blend, Sunproof Improved. The accelerator concentration in both cases is 0.00136 mole per 100 g of rubber. The stocks are compounded in a Banbury type internal mixer in the conventional manner at a temperature not exceeding 320°F. The accelerator is added to the stock on a rubber mill at about 120°F.

TABLE III

White Sidewall Stocks

|  | III-A | III-B |
|---|---|---|
| Smoked sheets | 50 | 50 |
| EPDM | 25 | 25 |
| SBR 1502 | 25 | 25 |
| Zinc oxide | 20 | 20 |
| Silica filler | 15 | 15 |
| Titanium dioxide | 35 | 35 |
| Stearic acid | 2 | 2 |
| Light process oil | 5 | 5 |
| Wax | 5 | 5 |
| Zinc dimethyl-dithiocarbamate | 0.45 | — |
| Zinc dodecylisopropyl-dithiocarbamate | — | 1.0 |
| Sulfur | 2.0 | 2.0 |
| Mooney scorch at 270°F | 11' 15" | 15' 30" |
| Physical properties after curing 30' at 320°F: |  |  |
| 300% Modulus | 210 | 300 |
| Tensile strength, psi | 1040 | 1380 |
| Elongation, % | 820 | 740 |
| Hardness, Shore A | 47 | 50 |

EXAMPLE IV

Table IV illustrates the practice of the invention with an EPDM-SBR blend, accelerated with decylisopropyl-dithiocarbamate (Stocks IV-B), docecylisopropyl-dithiocarbamate (Stock IV-C, IV-E) and octadecylisopropyldithiocarbamate (Stock IV-F). In stocks IV-A, IV-B and IV-C the concentration of accelerator is 0.00328 mole per 100 g of rubber; in Stocks IV-D, IV-E, and IV-F the concentration is 0.00164. The EPDM is the same as in Example I.

TABLE IV

Decylisopropyldithiocarbamate

Dodecylisopropyldithiocarbamate and

Octadecylisopropyldithiocarbamate in an

SBR/EPDM Blend

|  | IV-A | IV-B | IV-C | IV-D | IV-E | IV-F |
|---|---|---|---|---|---|---|
| SBR 1502 | 50.0 | 50.0 | 50.0 | 50.0 | 50.0 | 50.0 |
| EPDM | 50.0 | 50.0 | 50.0 | 50.0 | 50.0 | 50.0 |
| N-550 Black | 80.0 | 80.0 | 80.0 | 80.0 | 80.0 | 80.0 |
| Zinc Oxide | 5.0 | 5.0 | 5.0 | 5.0 | 5.0 | 5.0 |
| Stearic Acid | 0.75 | 0.75 | 0.75 | 0.75 | 0.75 | 0.75 |
| Circosol 4240 | 50.0 | 50.0 | 50.0 | 50.0 | 50.0 | 50.0 |
| Zinc dimethylthiocarbamate | 1.0 | — | — | 0.5 | — | — |
| Zinc decylisopropyl-dithiocarbamate | — | 2.0 | — | — | — | — |
| Zinc dodecylisopropyl-dithiocarbamate | — | — | 2.2 | — | 1.1 | — |
| Zinc octacecylisopropyldithiocarbamate | — | — | — | — | — | 1.4 |
| Sulfur | 2.5 | 2.5 | 2.5 | 2.5 | 2.5 | 2.5 |
| Mooney Scorch at 270°F | 8'45" | 12'00" | 13'30" | 11'15" | 18'00" | 17'15" |
| Physical Properties, Cured at 320°F |  |  |  |  |  |  |
| 300% 10' | — | — | 1550 | 1420 | — | — |
| 20' | — | — | — | 1900 | — | 1410 | 1430 |
| 30' | — | — | — | — | — | 1600 | 1590 |
| Tensile Strength 10' | 1390 | 1570 | 1680 | — | — | — |
| 20' | 1300 | 1600 | 1920 | 1250 | 1610 | 1610 |
| 30' | 1300 | 1780 | 1830 | 1280 | 1680 | 1500 |
| % Elongation 10' | 210 | 300 | 380 | — | — | — |
| 20' | 160 | 250 | 300 | 250 | 390 | 360 |
| 30' | 160 | 260 | 270 | 230 | 340 | 300 |
| Hardness, Shore A 10' | 66 | 61 | 60 | — | — | — |
| 20' | 67 | 63 | 62 | 63 | 63 | 64 |
| 30' | 68 | 64 | 64 | 64 | 63 | 67 |

EXAMPLE V

In the blends of Table V, EPDM-1 has an ethylene/propylene ratio of 57/43; iodine number 10; the diene is 5-ethylidene-2-norbornene; the Mooney viscosity is 55 (ML-4 at 212°F). EPDM-2 is the same as the EPDM of Example I. The accelerator concentration is 0.00164 mole per 100 g of rubber.

TABLE V

Long Chain Hydrocarbon Dithiocarbamates in a

NBR/EPDM Blend

|  | V-A | V-B | V-C | V-D | V-E | V-F |
|---|---|---|---|---|---|---|
| PARACRIL BLT | 50.0 | 50.0 | 50.0 | 50.0 | 50.0 | 50.0 |
| EPDM-1 | 50.0 | 50.0 | 50.0 | — | — | — |
| EPDM-2 | — | — | — | 50.0 | 50.0 | 50.0 |
| N-774 Black | 50.0 | 50.0 | 50.0 | 50.0 | 50.0 | 50.0 |
| Zinc Oxide | 5.0 | 5.0 | 5.0 | 5.0 | 5.0 | 5.0 |
| Stearic Acid | 0.75 | 0.75 | 0.75 | 0.75 | 0.75 | 0.75 |
| Zinc dimethyldithiocarbamate | 0.5 | — | — | 0.5 | — | — |
| Zinc dodecylisopropyldithiocarbamate | — | 1.1 | — | — | 1.1 | — |
| Zinc octadecylisopropyldithiocarbamate | — | — | 1.4 | — | — | 1.4 |
| Sulfur | 2.0 | 2.0 | 2.0 | 2.0 | 2.0 | 2.0 |

Physical Properties, Cured 30' at 320°F

| | | | | | | |
|---|---|---|---|---|---|---|
| Tensile strength, psi | 650 | 1390 | 1820 | 650 | 1500 | 1850 |
| Elongation, % | 130 | 230 | 260 | 140 | 200 | 260 |
| Hardness, Shore A | 70 | 69 | 70 | 70 | 70 | 70 |

EXAMPLE VI

Table VI shows blends of the EPDM of Example I with polychloroprene rubber (Neoprene W). The oil used is an aromatic extender oil, Sundex 790. The accelerator concentration is 0.00328 mole per 100 g of rubber.

TABLE VI

Long Chain Hydrocarbon Dithiocarbamates in a

Polychloroprene/EPDM Blend

| | VI-A | VI-B |
|---|---|---|
| Neoprene W | 50.0 | 50.0 |
| EPDM | 50.0 | 50.0 |
| N-550 Black | 80.0 | 80.0 |
| Oil | 30.0 | 30.0 |
| Stearic Acid | 0.6 | 0.6 |
| Magnesium Oxide | 4.0 | 4.0 |
| Zinc Oxide | 5.0 | 5.0 |
| Zinc Dimethyldithiocarbamate | 1.0 | — |
| Zinc Dodecylisopropyldithiocarbamate | — | 2.2 |
| Sulfur | 1.0 | 1.0 |

Physical Properties, Cured 30' at 320°F

| | | |
|---|---|---|
| Tensile Strength, psi | 1650 | 1800 |
| Elongation, % | 180 | 190 |
| Hardness, Shore A | 72 | 72 |
| Compression Set, 22 Hrs. at 212°F | 50 | 45 |

EXAMPLE VII

In Table VII, stocks VII-A and VII-B are carcass stocks (CAR), stocks VII-C and VII-D are white sidewall stocks (WSW), and stocks VII-E and VII-F are coverstrip stocks (CS). In this series, adhesion comparisons are made between 1. Standard-cured black stock with standard-cured black EPDM Blend (A-E).
2. Specially-cured black stock with invention-cured black EPDM Blend (B-F).
3. Standard-cured WSW EPDM blend with standard-cured black EPDM blend (C-E).
4. Invention-cured black EPDM blend with invention-cured WSW EPDM blend (F-D).

The EPDM employed in Table VII is the same as in Example III. The wax used is Sunproof Improved. Circosal 4240 naphthenic extender oil. Octamine is octylated diphenylamine. The resorcinol-aldehyde resin may be as described in U.S. Pat. No. 3,256,137, Danielson, June 14, 1966, col. 6, lines 8–12. The adhesive agent is 1-aza-5-methylol-3,7-dioxabicyclo [3.3.0] octane. Delac-S is N-cyclohexyl-2-benzothiazole sulfenamide. Delac MOR is N-oxydiethylene benzothiazole-2-sulfenamide. DPG is diphenylguanidine.

The adhesion tests results given in Table VII were determined by the procedure of ASTM-D-413. The results demonstrate the ability of EPDM blends, accelerated in accordance with the invention, whether white sidewall stock or black coverstrip stock, to adhere to highly unsaturated rubber stock such as carcass stock (cured conventionally, or cured with the accelerator used in the invention). In these tests, the indicated stocks are placed in face-to-face contact to make a laminate, placed in a mold and cured to vulcanize the stocks to each other, and then the adhesion test is carried out on the cured laminates. In the table "Int." indicates an interfacial separation, "St." indicates that the stock tore with no adhesion failure.

TABLE VII

Adhesion of coverstrip to

Carcass and White Sidewall

| | VII-A | VII-B | VII-C | VII-D | VII-E | VII-F |
|---|---|---|---|---|---|---|
| | CAR | CAR | WSW | WSW | CS | CS |
| Smoked Sheets 40.0 | 40.0 | 40.0 | 50.0 | 50.0 | 40.0 | 40.0 |
| SBR 1715 90.0 | 90.0 | — | — | — | — | — |
| EPDM — | — | — | 25.0 | 25.0 | 30.0 | 30.0 |
| SBR 1502 — | — | — | 25.0 | 25.0 | 30.0 | 30.0 |
| N-550 Black 60.0 | 60.0 | — | — | — | 25.0 | 25.0 |
| XX 203 Zinc Oxide 3.5 | 3.5 | 20.0 | 20.0 | 20.0 | 3.5 | 3.5 |
| Hi Sil 215 — | — | — | 15.0 | 15.0 | — | — |
| Titanox RA — | — | — | 35.0 | 35.0 | — | — |
| Stearic Acid 1.5 | 1.5 | 2.0 | 2.0 | 2.0 | 2.0 | 2.0 |
| Circo Lt. Oil — | — | 5.0 | 5.0 | 3.0 | 3.0 | 3.0 |
| Wax — | — | 5.0 | 5.0 | — | — | — |
| Circosol 4240 5.0 | 5.0 | — | — | — | — | — |
| OCTAMINE 1.0 | 1.0 | — | — | — | — | — |
| Resorcinol-aldehyde resin 2.0 | 2.0 | — | — | — | — | — |
| Adhesive agent 1.0 | 1.0 | — | — | — | — | — |
| DELAC S — | — | 1.0 | — | — | — | — |
| MBTS 1.25 | — | — | — | — | — | — |
| DELAC MOR — | — | — | — | 1.0 | — | — |
| DPG 0.2 | — | 0.3 | 0.3 | 0.3 | — | — |
| Zinc dodecylisopropyl-dithiocorbamaste — | 0.75 | — | 0.75 | — | 0.75 | |
| Sulfur 3.25 | 3.25 | 2.5 | 2.5 | 2.0 | 2.0 | |
| Mooney scorch at 270°F | 18'45" | 17'00" | 35'45" | 9'00" | 22'15" | 12'15" |

Static Adhesion at 250°F, after Laminating and Curing Stocks 60' at 320°F.

| | E-A | F-B | E-C | F-D |
|---|---|---|---|---|
| Lbs. Pull | 5.0 | 46 | 8.5 | 83 |
| Type Separation | Int. | St. | Int. | St. |

EXAMPLE VIII

Further data on adhesion, obtained in the same manner as in Example VII, are given in Table VIII, wherein the EPDM is the same as in Example III. The cis-BR is "Cis-4 No. 1203" of Phillips Petroleum, about 95 percent cis content. Paraflux is a hydrocarbon resin. The antiozonant may be N-phenyl-N'-hexyl-p-phenylene diamine. In order to observe the improved adhesion according to the invention the following pairs may be compared in Table VIII:

A-B to A-C (=std. v. invention)
A-D to A-E
B-D to B-E
D-F to D-G

The secondary amines used in these preparations may be prepared by reductive alkylation of primary amines with ketones.

Having thus described our invention, what we claim and desire to protect by Letters Patent is:

1. A composition comprising a blend of (A) 5 to 95 parts by weight of an ethylene-propylene-non-conjugated diene terpolymer rubber containing ethylene and propylene in weight ratio of from 20/80 to 80/20 and from 2 to 20 percent by weight of said non-conjugated diene, and (B) correspondingly TABLE VIII
[Use of long chain hydrocarbon dithiocarbamates for improved adhesion]

|  | VIII-A | VIII-B | VIII-C | VIII-D | VIII-E | VIII-F | VIII-G |
|---|---|---|---|---|---|---|---|
| Smoked sheets | 40.0 |  |  |  |  |  |  |
| SBR 1712 OZ |  |  |  | 40.0 | 40.0 | 50.0 | 50.0 |
| CIS BR |  | 68.75 | 68.75 |  |  |  |  |
| SBR 1715 |  | 25.0 | 25.0 |  |  |  |  |
| EPDM | 90.0 |  |  |  |  |  |  |
| SBR 1502 |  | 25.0 | 25.0 | 30.0 | 30.0 | 25.0 | 25.02 |
| 655 reclaim |  |  |  | 30.0 | 30.0 | 25.0 | 25.02 |
| N-550 Black |  | 65.0 | 65.0 |  |  |  |  |
| Circosol 4240 | 60.0 | 60.0 | 60.0 | 25.0 | 25.0 |  |  |
| Zinc oxide | 5.0 |  |  |  |  |  |  |
| Stearic acid | 3.5 | 3.5 | 3.5 | 3.5 | 3.5 |  |  |
| Paraflux | 1.5 | 1.25 | 1.25 | 2.0 | 2.0 | 2.0 | 2.0 |
| Antiozonant |  | 6.8 | 6.8 |  |  |  |  |
| Sunproof imp |  | 2.0 | 2.0 |  |  |  |  |
| XX 203 zinc oxide |  |  |  |  |  | 5.0 | 5.0 |
| Hi Sil 215 |  |  |  |  |  | 20.0 | 20.0 |
| Titanox RA |  |  |  |  |  | 15.0 | 15.0 |
| Octamine |  |  |  |  |  | 35.0 | 35.0 |
| Resorcinol-aldehyde resin | 1.0 |  |  |  |  |  |  |
| Circo lt. oil | 2.0 |  |  |  |  |  |  |
| Adhesive agent |  |  |  | 3.0 | 3.0 | 5.0 |  |
| MBTS | 1.0 |  |  |  |  |  |  |
| Delac Mor | 1.25 |  |  |  |  |  |  |
| Delac S |  | 1.0 |  | 1.0 |  |  |  |
| DPG |  |  |  |  |  | 1.0 |  |
| Zinc dodecylisopropyl dithiocarbamate | .2 | .3 |  | .3 |  | .3 |  |
| Sulfur | 3.25 | 2.2 | 2.0 | 2.0 | 2.0 | 2.5 | 2.0 |
| Stock to stock adhesion | A-B | A-C | A-D | A-E | B-D | B-E | D-F | D-G |
| Adhesion at 250° F.: |  |  |  |  |  |  |  |  |
| Lbs. pull | 42 | 50 | 8.0 | 29 | 16 | 40 | 17 | 67 |
| Type Failure | Stock | Stock | Int. | Stock | Int. stock | Stock | Int. stock | Stock |

Zinc dodecylisopropyl dithiocarbamate may be prepared as follows: In a 2-liter, three-neck, round-bottom flask equipped with a stirrer, thermometer and dropping funnel is placed 60 grams (1.5 moles) of sodium hydroxide and 60 ml of water (or 120 grams of 50 percent sodium hydroxide solution). One thousand ml. of isopropanol and 341 gm. (1.5 moles) of N-n-dodecyl-N-isopropyl amine. To this stirred solution is added 126 gm. (1.66 moles, 100 ml.) of carbon disulfide at such a rate as to maintain the reaction temperature at 25°–35° C. After all of the carbon disulfide has been added the solution is poured into a rapidly stirring solution of 140 gm. of zinc sulfate in 1,000 ml. of water. The rapid stirring is continued until the zinc salt solidifies (rapid stirring is important, and will cause small particle size solidification of the zinc salt and prevents caking of the mixture thus entrapping impurities). This gives a compound with an easily filterable particle size. When the product solidifies it is removed by filtration and dried. The yield is 98 percent of a white solid, m.p. 84°–85°C.

The following dithiocarbamic acid zinc salts may be made by an analogous procedure to that above by substitution of the appropriate amine for N-n-dodecyl-N-isopropyl amine:

| Dithiocarbamic acid, zinc salt | m.p. °C |
|---|---|
| N-n-octyl-N-isopropyl | 70–72 |
| N-n-octyl-N-(1,3-dimethyl butyl) | 44–48 |
| N-n-dodecyl-N-isopropyl | 84–85 |
| N-n-dodecyl-N-(1,3-dimethyl butyl) | 44–48 |
| N-n-dodecyl-N-cyclohexyl | 77–79 |
| N-n-octadecyl-N-isopropyl | 93–95 |
| N-n-octadecyl-N-(,3-dimethyl butyl) | 59–61 |
| N-n-(mixed $C_{16}$–$C_{18}$)-N-isopropyl | 79–85 |

The mixed $C_{16}$–$C_{18}$ alkyl amines are a tallow amine product commercially available as Armeen HT from 95 to 5 parts by weight of a conjugated diolefin polymer rubber containing at least 50 percent by weight of said conjugated diolefin, said blend containing sulfur as a vulcanizing agent and, as an accelerator of sulfur vulcanization, a chemical of the formula

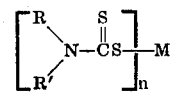

where M is a metal, $n$ is a number equal to the valence of the metal, and R and R' are non-aromatic hydrocarbon moieties having taken together a total of at least 11 carbon atoms.

2. A composition as in claim 1 in which R and R' taken together contain at least 14 carbon atoms.

3. A composition as in claim 1 in which R and R' taken together contain at least 18 carbon atoms.

4. A composition as in claim 1 in which at least one of R, R' has at least eight carbon atoms.

5. A composition as in claim 1 in which one of R, R' is a cycloalkyl group and the other is alkyl of at least eight carbon atoms.

6. A composition as in claim 1 in which at least one of R, R' has at least 12 carbon atoms.

7. A composition as in claim 1 in which R and R' are alkyl groups having up to 30 carbon atoms.

8. A composition as in claim 1 in which R is a long chain alkyl group having at least eight carbon atoms and R' is a shorter chain alkyl group having from three to six carbon atoms.

9. A composition as in claim 8 in which R has at least 12 carbon atoms.

10. A composition as in claim 8 in which R has up to 20 carbon atoms.

11. A composition as in claim 1 in which M is zinc and $n$ is 2.

12. A composition as in claim 1 in which R is dodecyl and R' is isopropyl.

13. A composition as in claim 1 in which M is zinc, $n$ is 2, R is dodecyl and R' is isopropyl.

14. The composition of claim 1 in unvulcanized form.

15. The composition of claim 1 in vulcanized form.

16. A method of making a vulcanizate comprising subjecting to vulcanizing conditions the composition of claim 1.

17. A composition as in claim 1 in which the highly unsaturated rubber (B) is SBR.

18. A composition as in claim 1 in which the highly unsaturated rubber (B) is NBR.

19. A composition as in claim 1 in which the highly unsaturated rubber is cis-polybutadiene rubber.

20. A composition as in claim 1 in which the highly unsaturated rubber is polychloroprene rubber.

21. A composition as in claim 1 in which the highly unsaturated rubber is polyisoprene rubber.

22. A composition as in claim 1 in which the non-conjugated diene in (A) is dicyclopentadiene.

23. A composition as in claim 1 in which the non-conjugated diene in (A) is 5-ethylidene-2-norbornene.

* * * * *